No. 835,461. PATENTED NOV. 6, 1906.
E. F. NORTHRUP.
ELECTRICAL MEASURING INSTRUMENT.
APPLICATION FILED MAY 26, 1906.

2 SHEETS—SHEET 1.

Witnesses
Inventor
E. F. Northrup
by John H. Hall
his Attorney

No. 835,461. PATENTED NOV. 6, 1906.
E. F. NORTHRUP.
ELECTRICAL MEASURING INSTRUMENT.
APPLICATION FILED MAY 26, 1906.
2 SHEETS—SHEET 2.
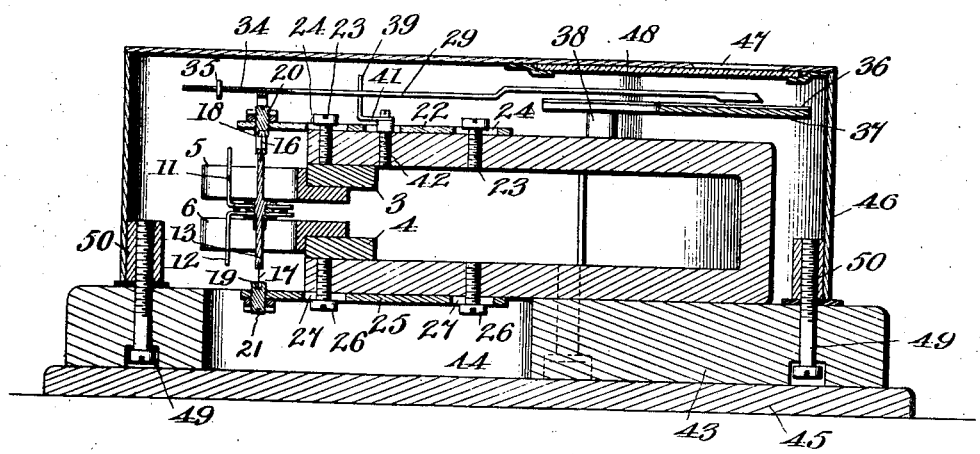
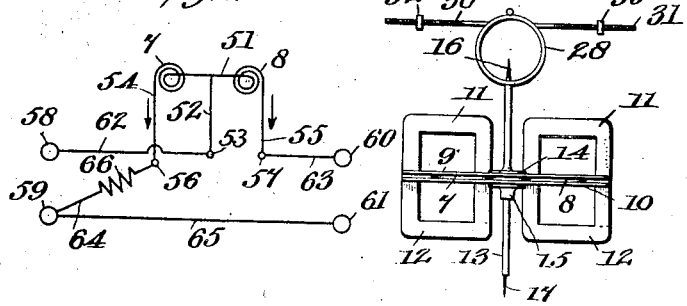
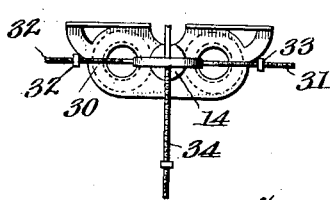
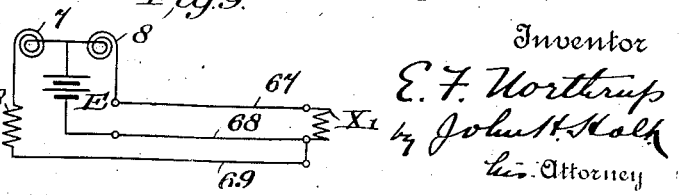
Witnesses
Geo. H. Bignell
W. B. Allen
Inventor
E. F. Northrup
by John H. Holk
his Attorney

UNITED STATES PATENT OFFICE.

EDWIN F. NORTHRUP, OF PHILADELPHIA, PENNSYLVANIA, ASSIGNOR TO THE LEEDS & NORTHRUP COMPANY, OF PHILADELPHIA, PENNSYLVANIA, A CORPORATION OF PENNSYLVANIA.

ELECTRICAL MEASURING INSTRUMENT.

No. 835,461.  Specification of Letters Patent.  Patented Nov. 6, 1906.

Application filed May 26, 1906. Serial No. 318,851.

*To all whom it may concern:*

Be it known that I, EDWIN F. NORTHRUP, a citizen of the United States, residing at Philadelphia, in the county of Philadelphia and State of Pennsylvania, have invented certain new and useful Improvements in Electrical Measuring Instruments, of which the following is a specification.

This invention relates more especially to instruments for measuring electrically by direct deflection the ratio of an unknown to a known quantity irrespective within wide limits of the absolute values of these quantities and of the operative current of electromotive force used. For example, the ratio measured may be that of an unknown to a known resistance when the instrument becomes a deflection-ohmmeter, or the ratio may be that of a resistance which changes with temperature to a fixed resistance when the instrument becomes a direct-reading instrument for the measurement of temperatures.

The instrument may also be used to measure other quantities.

In order to more fully describe my said invention, reference will be had to the accompanying drawings, in which—

Figure 1:
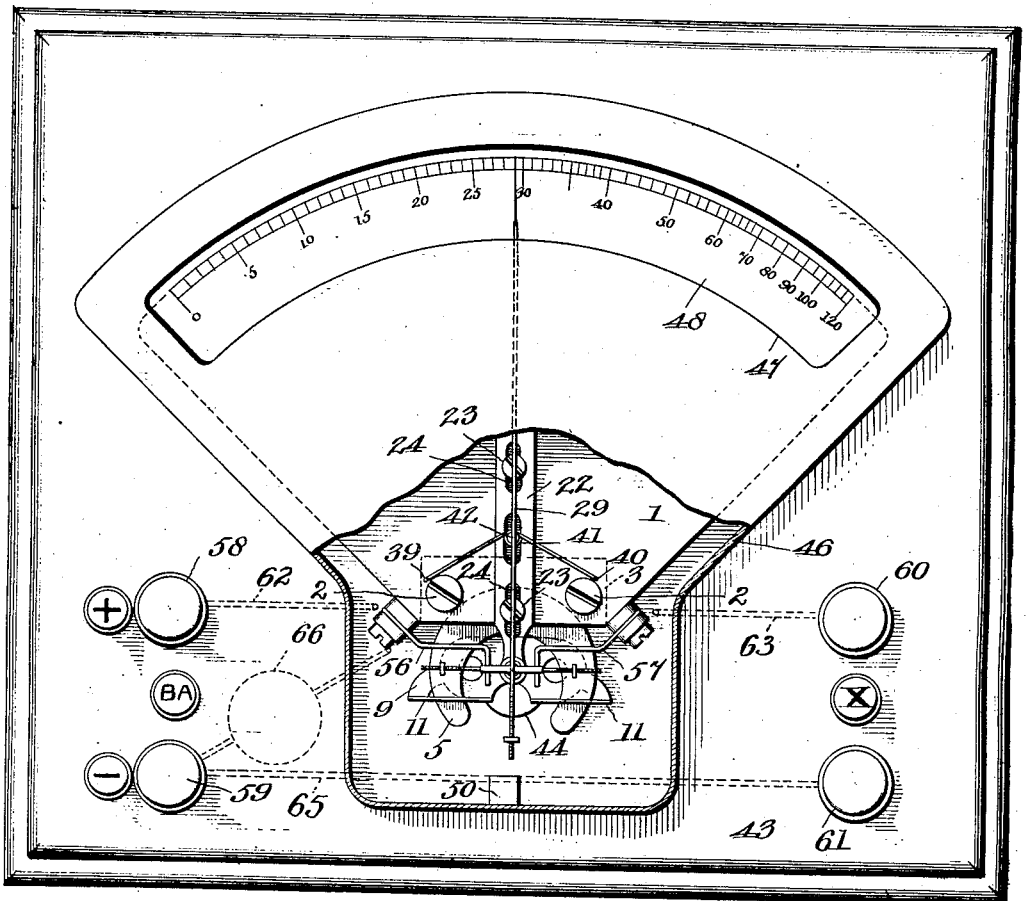
Figure 2:
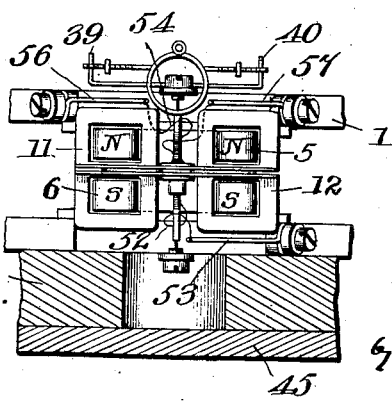

Figure 1 represents a top plan view, with a portion of the cover broken away, of one form of instrument embodying my present invention; Fig. 2, an enlarged fragmentary front elevation of magnet and moving system of said instrument; Fig. 3, a central vertical section of said instrument; Fig. 4, a front elevation of the moving system removed from the instrument; Fig. 5, a top plan view of said system; Figs. 6, 7, and 8, diagrammatic views to illustrate the principle and operation of the instrument, and Fig. 9 a diagram to illustrate the application of the instrument to the measurement of temperatures.

I will first describe a specific form of the instrument and then take up the theory of its operation.

Referring to the accompanying drawings, 1 represents the permanent field-magnet, preferably of cast-iron, to the pole ends of which are secured, as by means of screws 2 2, plates 3 and 4, preferably of Norway iron. Secured, respectively, to the plates 3 and 4 are two crescent-shaped pole-pieces 5 and 6, also preferably of Norway iron. These crescent-shaped pole-pieces are located one directly above the other, leaving a sufficient space therebetween for the moving system. Being secured to opposite poles of the magnet 1, one of these crescent-shaped pole-pieces is of north polarity and the other of south polarity. Pole-pieces of other shapes which will produce the desired form of field may be substituted for the specific form herein shown without departing from the spirit of my invention as viewed in its broader aspect.

The moving system comprises two flat coils 7 and 8, mounted in a damping-frame consisting of two preferably aluminium plates 9 and 10, having open wings 11 and 12, adapted to inclose the respective pole-pieces 5 and 6 when the system is in position without engaging the same. (See Fig. 2.) The system thus damped is practically dead-beat.

The damping-frame and coils are mounted upon a shaft 13, which passes through the said frame intermediate of the coils. This shaft is provided with a flanged portion or collar 14, which, together with a flanged nut 15, screw-threaded on the shaft, form clamping means to hold the plates 9 and 10 in position and to clamp the coils therebetween. The shaft 13 is provided with hardened pivot-points 16 and 17 at its respective ends mounted, respectively, in jeweled bearings 18 and 19, carried by adjusting-screws 20 and 21. The screw 20 is carried in a plate 22, adjustably secured to the top of the magnet 1 by means of screws 23, passing through slots 24 in said plate. The screw 21 is carried in a similar plate 25, adjustably secured to the lower face of the magnet 1 by means of screws 26, passing through slots 27 in said plate.

The pivotal bearings of the shaft 13 are so located that the axis of rotation for the moving system approximately coincides with the center of the arcs forming the outside edge of the crescent-shaped pole-pieces—that is, the axis of rotation of said system should coincide approximately with the point $z_1$, Fig. 6. By means of the adjustable plates 22 and 25 the position of the axis may, however, be varied. The reason for this will hereinafter more fully appear. With the system thus mounted one coil will move so as to get more under the pole-pieces and the other so as to get more from under said pole-pieces as the system rotates.

Upon the upper end of the shaft 13 is rigidly mounted a small ring 28, which when the system is in position incloses the upper pivot-bearing. Secured to the top of this ring is a pointer or index 29, preferably of aluminium or other very light material, which may be screw-threaded, as at 34, upon which portion it may be made to carry one or more compensating weights, as the weight 35. Screw-threaded rods 30 and 31, the latter carrying screw-threaded compensating balance-weights 32 and 33, respectively, may also be mounted on the ring 28 for the purpose of balancing the system.

The pointer 29 is adapted to move over a scale 36, mounted upon a segmental plate 37, which may in turn be mounted on supports 38, carried upon the upper face of the magnet. The graduations of this scale will of course depend upon the quantity which the instrument is designed to measure. In the drawings a scale is shown laid off in ohms. If the instrument is to be used in measuring temperatures, the scale would be laid off in degrees of temperature, and so on, as the case may be. In any event the scale would be laid off on an arc struck with the axis of rotation of the moving system as the center.

The angular movement of the pointer 29 may be limited by two small wire stops 39 and 40, which may be the ends of a small wire 41, secured to a screw 42, screwed into the top of the magnet.

While I have herein shown a pointer instrument, I do not wish to be understood as limiting my invention to this specific type. Moreover, I do not wish to be understood as confining my present invention to the specific construction and mounting of the movable system herein shown.

The magnet 1 is mounted fast upon a preferably wooden base 43, having a cut-away portion 44, over which extends the ends of the magnet carrying the moving system. This base constitutes a false bottom adapted to rest upon a real bottom or base 45, to which it may be secured in any suitable way.

Adapted to inclose the magnet, the moving system, pointer, and scale is a preferably metal cover 46, having an elongated opening 47, adapted to register with the scale. Back of this opening is secured a glass plate 48. The cover 46 rests upon the base 43 and may be held down upon the same by means of countersunk screws 49, which engage lugs 50, secured to the inside of said cover.

The electrical connections of the system are as follows: The coils 7 and 8 in the form shown are wound in the form of two bobbins with open centers and when viewed from the same flat side are wound in the same direction, so that corresponding flat sides of said coils will have like polarity. The inner terminals of the two coils are connected, as by a conductor 51, which is tapped by a leading-in wire 52, connected to an insulated terminal 53. The outer terminals of the two coils are connected, respectively, to lead-wires 54 and 55, which lead, respectively, to insulated terminals 56 and 57. The said insulated terminals may be connected to the magnet as shown, so that the magnet and system may be lifted from the base without disturbing the electrical connections of the leading-in wires. The three lead-wires 52, 54, and 55 are preferably fine silver wires and so very delicate that their mechanical or torsional effect on the angular movement of the system is negligible, so that the system may be freely movable.

Mounted upon the base 43 are four binding-posts 58, 59, 60, and 61. The binding-post 58 is connected to the terminal 53 by conductor 62, the binding-post 59 is connected to the terminal 56 through the resistance 66 by means of conductor 64, the binding-post 60 is connected to the terminal 57 by conductor 63, and the binding-posts 59 and 61 are electrically connected by conductor 65, all of which conductors may be countersunk in base 43. In series with the conductor 64 is mounted a resistance-coil 66, the function of which will hereinafter more fully appear. This coil 66 may also be countersunk in a recess cut in the base 43.

Binding-posts 58 and 59 are for connection to the source of electromotive force, while binding-posts 60 and 61 are for connection to that which has to be measured. For the purpose of indicating how these connections are to be made I may provide indicating-buttons marked $+$, $-$, BA, and X.

The theory of the instrument is as follows: Referring to the diagram Fig. 8, let $r_1$ represent the resistance of the coil 8, having $n_1$ turns of wire, and $r_2$ the resistance of the coil 7, having $n_2$ turns of wire; also, let $H_1$ represent the flux of the field through the coil 8, $H_2$ the flux of the field through the coil 7, and $I_1$ and $I_2$ the current strengths in the respective coils 8 and 7. Let R equal the resistance of a coil 58 of fixed value, $x$ the resistance of a coil X of unknown value, and E an electromotive force applied between the coils and resistances, as shown. Then when the system has moved to a position of equilibrium $H_1 n_1 I_1 = H_2 n_2 I_2$;

but, according to Ohm's law, $I_1 = \dfrac{E}{r_1 + x}$ and $I_2 = \dfrac{E}{r_2 + R}$ Substituting the values of $I_1$ and $I_2$ in the above equation, we have $x = \dfrac{H_1 n_1 (r_2 + R) - H_2 n_2 r_1}{H_2 n_2}$ In practice $r_1 = r_2$ and $n_1 = n_2$.

Therefore $x = \dfrac{r_1(H_1 - H_2) + H_1 R}{H_2}$

Generally we can take $r_1 = o$ as compared with R, then $x = \frac{H_1}{H_2} R$ or $H_2 x = H_1 R$.

The system will therefore be in rotational equilibrium when $H_2 x = H_1 R$; but in order for this to be true the system must be capable of moving in such manner and the magnetic fields acting thereon must be so disposed or arranged that as coil 7 gets into more of the field or includes an increasing number of lines of force the coil 8 must move into less of a field or must include a decreasing number of lines of force, or vice versa. This is accomplished by mounting the coils for movement in a field which in the instrument shown is produced by the crescent-shaped pole-pieces 5 and 6, (see also Fig. 6,) in which the coils are indicated diagrammatically in dotted lines. In Fig. 6, let the point $z_1$ represent the center of the outer arc of the crescent-shaped pole-piece and $z_2$ the center of the inner arc thereof. It is evident that if coils 7 and 8, rigidly connected by a frame, rotate through a small angle in the plane of the paper on $z_2$ as a center these coils will remain equally under the pole-piece. If, however, they rotate on the point $z_1$ as a center by a clockwise rotation coil 7 will move more and more under the pole-piece, while the coil 8 will move more and more from under the pole-piece, and vice versa, for anticlockwise rotation. Thus the effective field of force acting on coils 7 and 8 changes with the rotation thereof. The nearer the center of rotation approaches the point $z_2$ the greater must be the angle of deflection to change by a given amount the ratio $\frac{H_1}{H_2}$. Hence bringing the center of rotation of the system near point $z_2$ "opens the scale," while bringing the said center of rotation nearer point $z_1$ "closes the scale." Now if currents flow through both coils and in such a direction as to cause both coils to try to move from under the pole-pieces the system will seek a position of equilibrium which is independent of the actual value of the currents flowing and which depends only upon the ratio of the portions of the main current, which divides to flow in the two coils.

The foregoing is true only when the system is freely movable. In order that any deflection instrument may measure the ratio of two quantities and have its indications independent of the actuating-current used, the moving system must not be in the control of any appreciable mechanical forces which are a function of the angle of deflection. When the actuating-current or electric potential forces acting become *nil*, the system must be in neutral equilibrium in respect to angular movement. The instrument, therefore, as used as a ratio instrument is essentially not a torsional-spring instrument. The leading-in wires, therefore, are made so delicate that they exercise a negligibly small control as compared with the control of the magnetic forces.

It will be seen by a reference to diagram Fig. 8 and in view of the foregoing explanation that by connecting a resistance between points 56 and 59, for example, of fixed value the instrument will measure the ratio of value of its resistance to that of a resistance or the equivalent thereof of unknown value connected between the points 60 and 61, for example. Then by calibrating the scale for different positions of the index to correspond to different values of X the instrument becomes direct reading.

If X be the resistance-wire of an electric thermometer, the different values of resistance of this wire under various degrees of heat may be laid off on the scale in degrees of temperature when the instrument becomes a direct-reading instrument for the measurement of temperatures.

The instrument is shown diagrammatically in Fig. 9 connected for reading temperatures, where $X_1$ represents the resistance-wire of an electrical thermometer located at a distance from the instrument, which is usually the case in practice, and connected to the instrument by leads 67, 68, and 69.

Since the coil 58 is a fixed resistance and the resistance of coil $X_1$ varies with the temperature, the extent of the deflection of the instrument determines the ratio of resistance of coil $X_1$ to coil 58, or $\frac{x}{R}$, where $x$ equals resistance of coil $X_1$ and R the resistance of coil 58. Also since 67 on the $x$ side may be equal in resistance to the wire 69 on the R side this arrangement practically compensates for changing resistance in the thermometer-leads. This is an extremely simple and efficient way of reading temperatures, as the readings are practically independent of the variations in the current used.

An instrument of the kind herein described will operate for temperature measurements on three or four series-connected dry-cells or may be used with a commutated current from a hand-magneto. The instrument used in this capacity is especially valuable for rapidly taking the high and often variable temperatures of furnaces and the likes.

What I claim is—

1. An electrical measuring instrument, comprising a magnet, a moving system comprising a plurality of current-carrying coils mechanically free to move in the field of said magnet in such a manner that as one of said coils moves more into said field the other coil will move more out of said field, and vice versa, and circuit connections for connecting said coils each in a separate branch of a divided circuit, the movements of said coils due to the current in said circuit being independent of the strength of said current but a function of the ratio in which it divides in said branches.

2. An electrical measuring instrument, comprising a magnet, a moving system comprising a plurality of current-carrying coils located outside of a common axis and mechanically free to move therearound in the field of said magnet in such a manner that as one of said coils moves more into said field the other coil will move more out of said field and vice versa, and circuit connections for connecting said coils each in a separate branch of a divided circuit, the movements of said coils due to the current in said circuit being independent of the strength of said current but a function of the ratio in which it divides in said branches.

3. An electrical measuring instrument, comprising a magnet having facing pole-pieces; a moving system comprising a plurality of current-carrying coils located outside of a common axis and mechanically free to move therearound in the field of said magnet in such a manner that as one of said coils moves more into said field the other coil will move more out of said field and vice versa; circuit connections for connecting said coils each in a separate branch of a divided circuit, the movements of said coils due to the current in said circuit being independent of the strength of said current but a function of the ratio in which it divides in said branches; a resistance permanently in one of said branches in series with the moving coil in that branch; an indicator operated by said moving system, and a scale to coöperate with said indicator for direct reading.

4. An electrical measuring instrument, comprising a permanent magnet having pole-pieces crescent-shaped as herein described; a moving system comprising two rigidly-connected flat current-carrying coils located on different sides of a common axis and mechanically free to move therearound in the field between said pole-pieces in such a manner that as one of said coils moves more into said field the other coil will move more out of said field and vice versa, one of said coils being electrically connected to the other; a lead tapped onto said connection between said coils, two additional leads, one from the outer terminal of each of said coils; an indicator operated by said moving system, and a scale to coöperate with said indicator for direct reading.

5. An electrical measuring instrument, comprising a magnet having facing pole-pieces; a moving system comprising two rigidly-connected current-carrying coils located outside of a common axis and mechanically free to move therearound in the field between said pole-pieces in such a manner that as one of said coils moves more into said field the other coil will move more out of said field and vice versa; circuit connections for connecting said coils each in a separate branch of a divided circuit, the movements of said coils due to the current in said circuit being independent of the strength of said current but a function of the ratio in which it divides in said branches; an indicator operated by said moving system, and a scale to coöperate with said indicator for direct reading.

6. An electrical measuring instrument, comprising a magnet having facing pole-pieces; a moving system comprising two rigidly-connected current-carrying coils located outside of a common axis and mechanically free to move therearound in the field between said pole-pieces in such a manner that as one of said coils moves more into said field the other coil will move more out of said field and vice versa; circuit connections for connecting said coils each in a separate branch of a divided circuit, the movements of said coils due to the current in said circuit being independent of the strength of said current but a function of the ratio in which it divides in said branches; a resistance permanently in one of said branches in series with the moving coil in that branch; an indicator operated by said moving system, and a scale to coöperate with said indicator for direct reading.

7. An electrical measuring instrument, comprising a permanent magnet having pole-pieces crescent-shaped as herein described; a moving system comprising two rigidly-connected flat current-carrying coils located on opposite sides of a common axis and mechanically free to move therearound in the field between said pole-pieces in such manner that as one of said coils moves more into said field the other coil will move more out of said field and vice versa; circuit connections for connecting said coils each in a separate branch of a divided circuit, the movement of said coils due to the current in said circuit being independent of the strength of said current but a function of the ratio in which it divides in said branches; a resistance permanently in one of said branches in series with the moving coil in that branch; an indicator operated by said moving system, and a scale to coöperate with said indicator for direct reading.

8. An electrical measuring instrument, comprising a field-magnet having pole-pieces crescent-shaped as described; a moving system comprising two rigidly-connected flat current-carrying coils supported by and located on opposite sides of and substantially equidistant from a common axis, said axis being eccentric with the arcs forming the inner boundaries of the crescents of said pole-pieces 9. An electrical measuring instrument, comprising a field-magnet having pole-pieces crescent-shaped as described, a supporting-axis perpendicular to the pole-faces of said magnet, said axis being eccentric with the arcs forming the inner boundaries of the crescents of said pole-pieces, a damping-frame comprising two plates of non-magnetic metal rigidly mounted on said axis and having wings adapted to encircle said pole-pieces as described, and two flat current-carrying coils mounted between said plates and located on opposite sides of and substantially equidistant from said axis.

In testimony whereof I affix my signature in presence of two witnesses.

EDWIN F. NORTHRUP.

Witnesses:
JULIUS BERNSTEIN,
W. L. SWETLAND.